United States Patent [19]
Mizoguchi

[11] Patent Number: 4,567,599
[45] Date of Patent: Jan. 28, 1986

[54] AUTOMATIC ADAPTIVE EQUALIZER HAVING IMPROVED RESET FUNCTION

[75] Inventor: Shoichi Mizoguchi, Tokyo, Japan

[73] Assignee: NEC Corporation, Tokyo, Japan

[21] Appl. No.: 537,602

[22] Filed: Sep. 30, 1983

[30] Foreign Application Priority Data

Oct. 1, 1982 [JP] Japan .................................. 57-173653

[51] Int. Cl.⁴ ........................ H04L 25/03; H04L 7/04; H03K 5/135
[52] U.S. Cl. .......................................... 375/14; 333/18; 375/106
[58] Field of Search ...................... 333/18; 375/12, 14, 375/118, 119, 110, 106; 371/47; 331/14

[56] References Cited

U.S. PATENT DOCUMENTS

| | | | |
|---|---|---|---|
| 4,061,978 | 12/1977 | Motley et al. | 333/18 |
| 4,146,840 | 3/1979 | McRae et al. | 333/18 |
| 4,352,190 | 9/1982 | Hullwegen | 375/14 |
| 4,411,000 | 10/1983 | Kustka | 333/18 |

Primary Examiner—Benedict V. Safourek
Attorney, Agent, or Firm—Sughrue, Mion, Zinn, Macpeak, and Seas

[57] ABSTRACT

The present invention features an automatic adaptive equalizer which detects asynchronism in a demodulator coupled to the equalizer and intermittently generates a reset signal. This signal intermittently renders a transversal filter of the adpative equalizer operative during a period in which the filter is normally rendered inoperative by a control loop of the adaptive equalizer.

8 Claims, 5 Drawing Figures

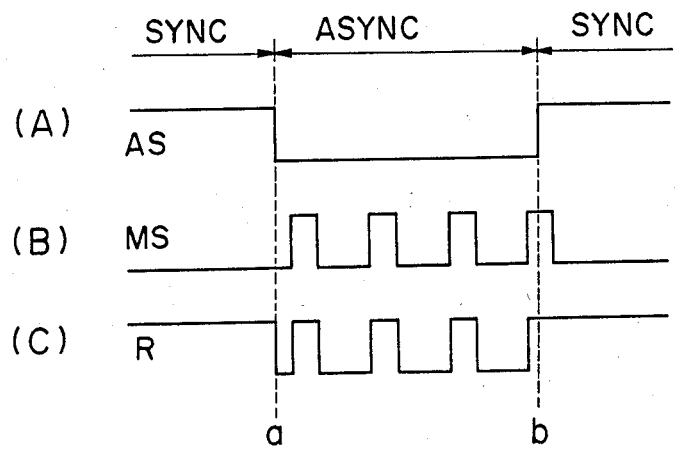
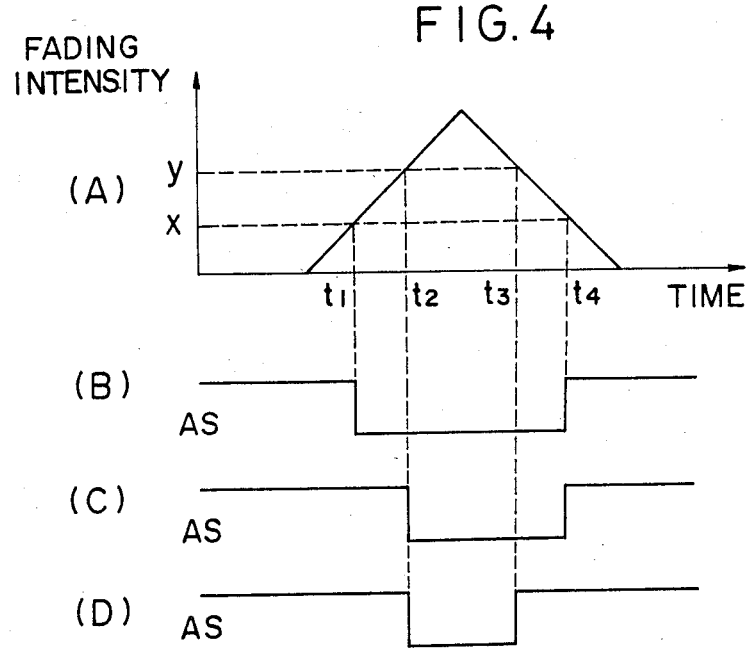

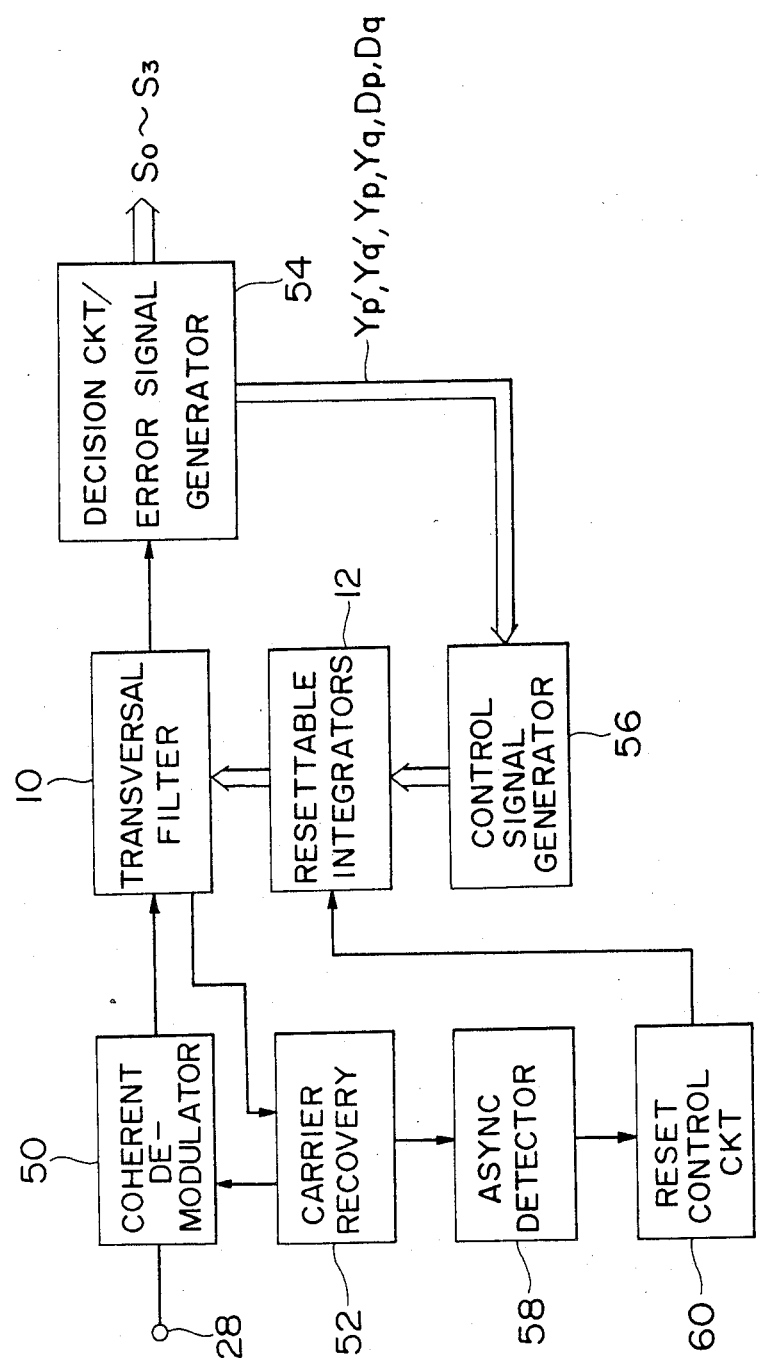

AUTOMATIC ADAPTIVE EQUALIZER HAVING IMPROVED RESET FUNCTION

BACKGROUND OF THE INVENTION

1. Field of the Invention

This invention relates to an automatic adaptive equalizer and more specifically to such an equalizer featuring an improved reset function by which resynchronization can be achieved in a shorter time duration as compared with a known equalizer. The present invention is most suited for use in a digital radio transmission system.

2. Description of the Prior Art

A digital radio transmission system is susceptible to multipath fading or the like and invites waveform distortion of the transmitted signal, which degrades signal quality and which may cause a short break in transmission reception. In order to minimize these problems, it is the current practice to employ an automatic adaptive equalizer using a transversal filter or a decision feedback loop.

The adaptive equalizer in a digital radio transmission system, however, has encountered the difficulty that distortion of the transmitted signal is apt to exceed the capability thereof. More specifically, upon the distortion reaching a level at which the equalizer is unable to deal with same, asynchronism of clock and carrier signals in a demodulator is induced and results in asynchronism of the control loop of the transversal filter. These conditions induce signal distortion within the equalizer itself. This means that even if the distortion of the transmitted signal falls within the capability of the equalizer, the synchronized state is not automatically restored in the equalizer. A known approach to overcoming this problem is to reset the tap gain controllers of the transversal filter to their initial states upon the occurrence of asynchronism in the demodulator. This prior art technique maintains the adaptive equalizer at reset until resynchronism of the clock and carrier in the demodulator occurs. Accordingly, as the equalizer remains inoperative during this time period, a drawback is encountered in that the control loop of the equalizer is not brought back into synchronization unless the waveform distortion of the transmitted signal is lowered to a considerable extent.

SUMMARY OF THE INVENTION

It is therefore an object of the present invention to provide an automatic adaptive equalizer or the like which includes circuitry via which the inoperative period due to distortion of the transmitted signal, is minimized.

In general terms the present invention features an automatic adaptive equalizer which detects asynchronism in a demodulator coupled to the equalizer and intermittently generating a reset signal. This signal intermittently renders a transversal filter of the adaptive equalizer operative during a period in which the filter is normally rendered inoperative by a control loop of the adaptive equalizer.

More specifically, the present invention takes the form of an automatic adaptive equalizer comprising: a first means for equalizing an incoming signal in response to a first control signal; a second means for detecting asynchronism in a demodulator coupled to the equalizer; a control loop for producing the first control signal according to the output of the first means, the control loop being responsive to the detection of the asynchronism by the second means for rendering the first means inoperative; a reset control circuit provided between the second means and the control loop, and responsive to the output of the second means for intermittently issuing a reset signal; and a third means, which forms part of the control loop, responsive to the reset signal for intermittently rendering the first means operative while the asynchronism is detected.

BRIEF DESCRIPTION OF THE DRAWINGS

The features and advantages of the present invention will become more clearly appreciated from the following description taken in conjunction with the accompanying drawings in which like blocks or circuits are denoted by like reference numerals and in which:

FIGS. 3(A)–(C) each is a time chart of the signals appearing in the FIG. 2 arrangement;

FIG. 4(A) shows fading intensity as a function of time;

FIG. 4(B) shows a signal AS produced without the provision of an equalizer;

FIG. 4(C) shows a signal AS produced by a prior art equalizer (i.e. an equalizer which uses conventional resetting); and FIG. 4(D) shows the signal AS produced by the equalizer equipped with intermittent resetting according to the present invention; and FIG. 5 is a simplified block diagram showing a second embodiment of this invention.

DETAILED DESCRIPTION OF THE PREFERRED EMBODIMENTS

Figure 1:
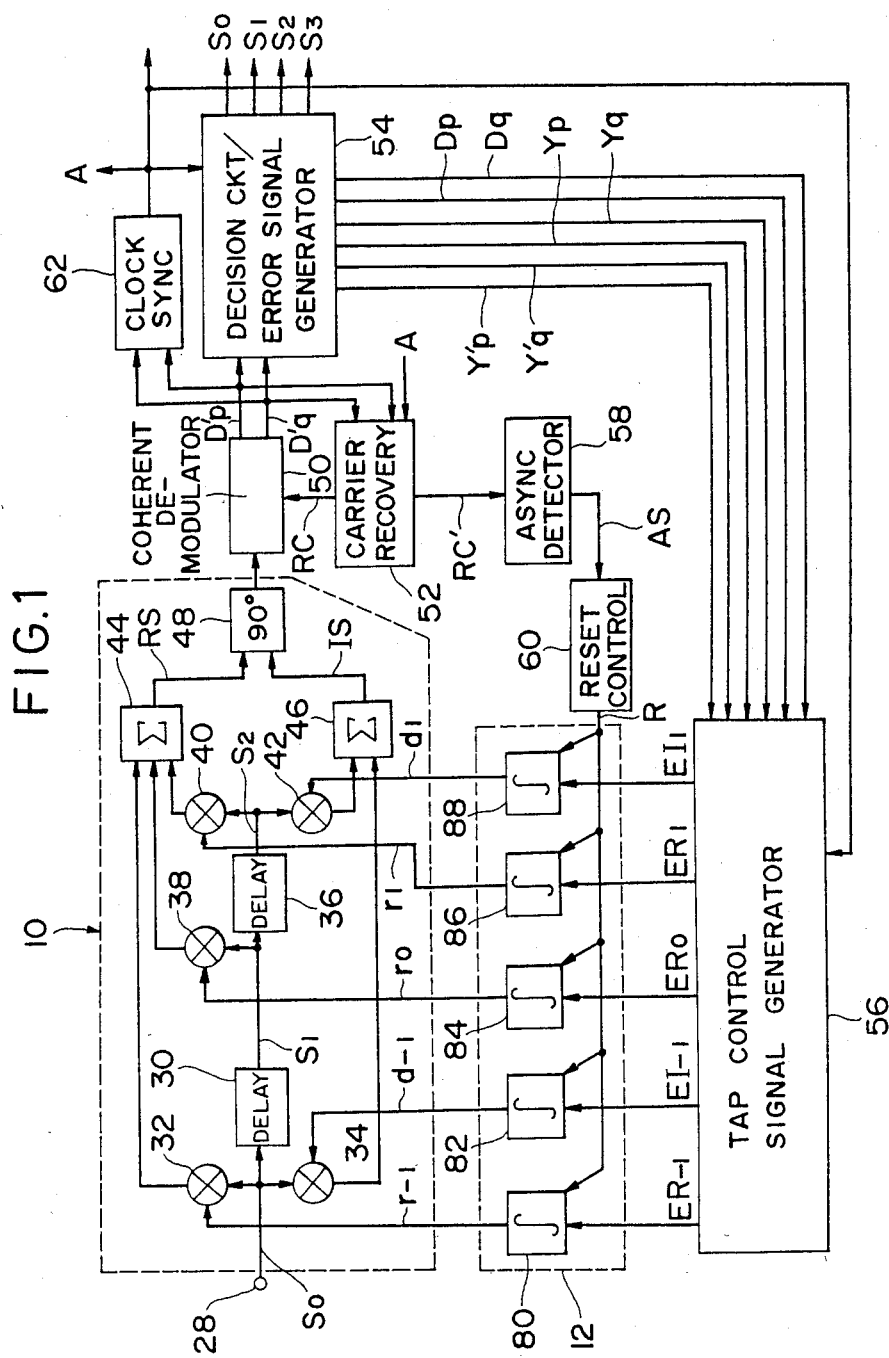
FIG. 1 is a block diagram showing a first embodiment of this invention.

Reference is now made to FIG. 1, which shows in block diagram form a first embodiment of this invention. This arrangement comprises a transversal filter 10, an integrator block 12 including five resettable integrators 80, 82, 84, 86, and 88, a coherent demodulator 50, a carrier recovery circuit 52, a decision circuit/error signal generator 54, a tap control signal generator 56, an asynchronism detector 58, a reset control circuit 60, and a clock synchronizer 62, all of which are coupled as shown. In the FIG. 1 arrangement, a modulated IF (Intermediate Frequency) input signal takes a form of a 16-QAM (Quadrature Amplitide Modulation) signal and the transversal filter 10 is of a three-tapped type.

Note that the following discussions are extendable to a general application wherein the IF input is an L-QAM signal ($L=l^2$ wherein l is an integer equal to or greater than 2) or an M-phase phase-modulated signal ($M=2^k$ wherein k is an integer equal to or greater than 2), and wherein an automatic adaptive equalizer employs an N-tapped (N=a positive integer) transversal filter which is provided in either an IF or a baseband signal stage.

A modulated input signal $S_0$ is applied via an input terminal 28 to a delay circuit 30 and also to two variable tap gain controllers 32 and 34. The controllers 32 and 34 are arranged to multiply the signal $S_0$ by control signals $r_{-1}$ and $d_{-1}$ which are derived from the resettable integrators 80 and 82, respectively. The delay circuit 30 generates a signal $S_1$ which is delayed by a predetermined time interval with respect to the input signal $S_0$.

The signal $S_1$ is supplied to a variable tap gain controller 38 of a main tap and is multiplied by a control signal $r_0$ from the resettable integrator 84. The signal $S_1$ is further delayed in another delay circuit 36 which outputs a delayed signal $S_2$. The signal $S_2$ is applied to another two variable tap gain controllers 40 and 42 and is multiplied therein by control signals $r_1$ and $d_1$ from the resettable integrators 86 and 88, respectively. The outputs of the variable tap gain controllers 32, 38, and 40 are summed up at a summing circuit 44 which outputs a signal RS, while the outputs of the variable tap gain controllers 34 and 42 are summed up at a summing circuit 46 which outputs a signal IS. The signals RS and IS are then combined in a 90°-directional coupler 48 in a manner to have a phase difference of 90° to each other. The coherent demodulator 50 is arranged to coherently demodulate the output of the coupler 48 using a recovered carrier RC from the carrier recovery circuit 52, and generates two baseband signals Dp' and Dq'. The baseband signals Dp' and Dq' each have four-values in this embodiment.

The baseband signals Dp' and Dq' are received by the carrier recovery circuit 52 which produces a recovered carrier to be applied to the coherent demodulator 50 as mentioned above. The carrier recovery can be implemented by a known technique such as Costas loop baseband processing, for example.

The baseband signals Dp' and Dq' are fed to the decision circuit/error signal generator 54 which outputs four data signals $S_0$, $S_1$, $S_2$, and $S_3$, and which also outputs error signals Yp', Yq', Yp, Yq, and demodulated data signals Dp and Dq. The error signals Yp', Yq', Yp, and Yq are produced by determining the deviations of the baseband signals Dp' and Dq' from each of the four reference values which have been set according to distortion free signals. The error signals Yp', Yq', Yp, and Yq and the data signals Dp and Dq are then applied to the tap control signal generator 56. The generator 56 determines, based on the error and data signals applied, timing points at each of which intersymbol interference (waveform distortion) occurs, and then produces tap control signals $ER_0$, $ER_{-1}$, $ER_1$, $EI_{-1}$, and $EI_1$ which are fed to the resettable integrators 84, 80, 86, 82, and 88, respectively.

The carrier recovery circuit 52 applies its output RC' to the asynchronism detector 58 which outputs a signal AS representative of whether the circuit 52 (i.e. the coherent demodulator 50) is out of synchronism. The asynchronism detector 58 may take the form of the arrangement disclosed in U.S. Pat. No. 4,121,166. Alternatively, the method of detecting error rate of transmission data disclosed in U.S. Pat. No. 3,721,959 may be used. The output AS of the asynchronism detector 58 assumes one of the two logic levels during the synchronized state of the demodulator 50, while assuming the other logic level when the demodulator 50 goes out of synchronism. The reset control circuit 60 responds to the other logic level of the signal AS and intermittently resets each resettable integrator coupled thereto, the manner of which will be described in detail with reference to FIGS. 2 and 3.

Figure 2:
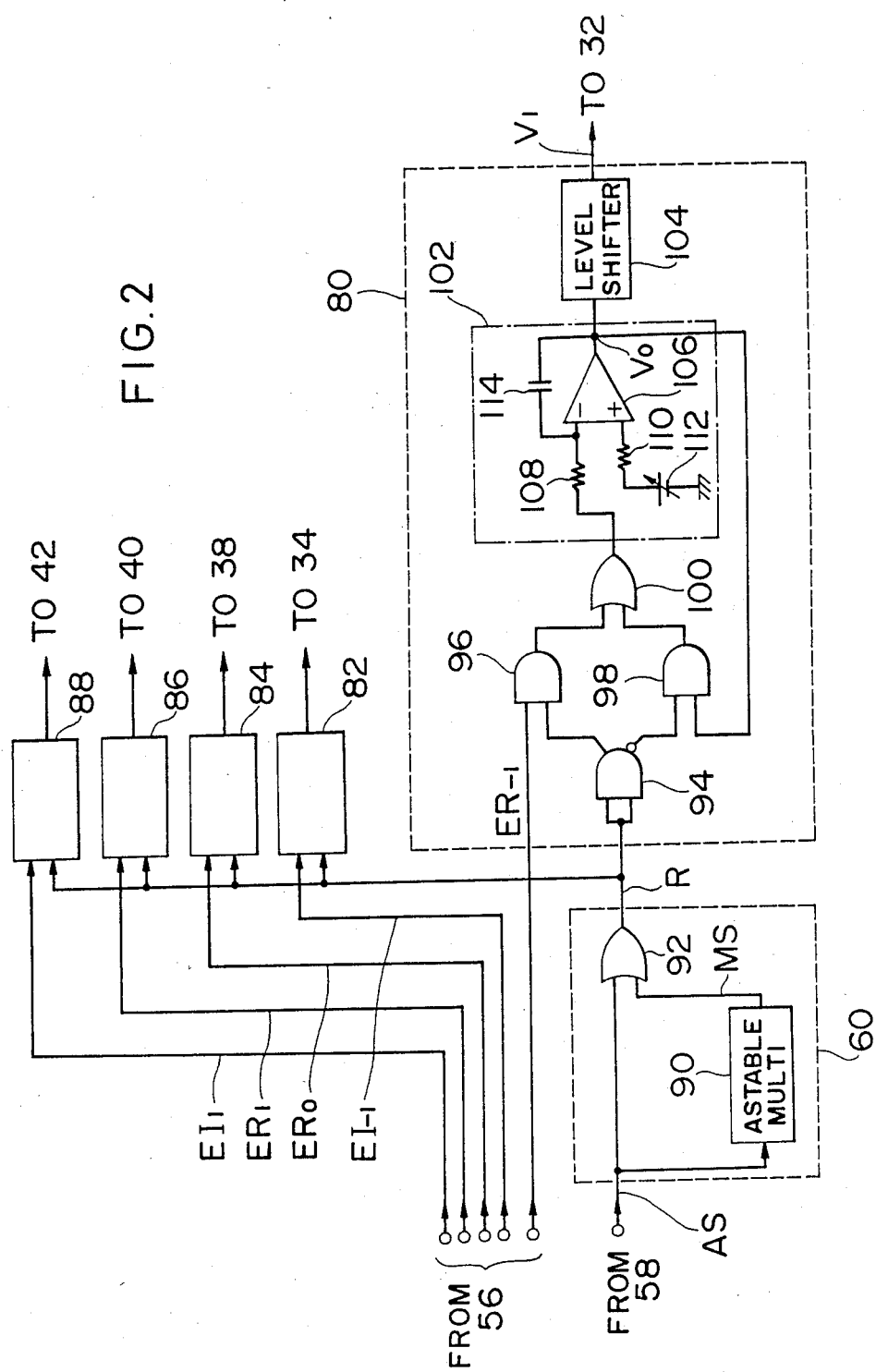
FIG. 2 is a detailed block diagram showing a reset control circuit and one resettable integrator shown in FIG. 1, together with associated blocks.

FIG. 2 is a block diagram showing detailed circuit arrangements of the reset control circuit 60 and the resettable integrator 80, together with the associated integrators 82, 84, 86, and 88. The resettable integrators 82, 84, 86, and 88 are shown in block form in that each arrangement as well as the operation thereof is identical with that of 80. Therefore, only the integrator 80 will be discussed. The control circuit 60 consists of an astable multivibrator 90 and an OR gate 92 while the resettable integrator 80 comprises an AND/NAND gate 94, two AND gates 96 and 98, an OR gate 100, an integrator 102, and a level shifter 104, which are coupled as shown. The OR gate 92 operates as a switching means in this embodiment. The integrator 102 includes an operational amplifier 106, two resistors 108 and 110, an offset voltage regulator 112, and a capacitor 114. The offset voltage regulator 112 is adjusted so that the DC voltage on one input of the amplifier 106 equals or approximates the DC voltage on the other input.

Before describing the operation of the FIG. 2 circuit, let it be assumed that the signal AS takes a logic "0" when the clock and carrier signals in the demodulator 50 goes out of synchronism and takes a logic "1" when synchronized again, as shown in FIG. 3(A).

The operation of the FIG. 2 circuit wherein the signal AS takes "0" at a time point "a" and takes "1" at a time point "b" will now be set forth. The astable multivibrator 90 initiates oscillation in response to "0" of the signal AS and outputs a signal MS alternating between "1" and "0". The oscillation is terminated in response to "1" of the signal AS, as shown in FIG. 3(B). The signal MS is applied to the OR gate 92 which outputs a signal R shown in FIG. 3(C). The signal R is fed to the AND/NAND gate 94 of the resettable integrator 80. As long as the signal R assumes "1", the gate 94 allows the AND gates 96 and 98 to be opened and closed respectively. Thus, the control signal $ER_{-1}$ passes through the gates 96 and 100 and thus charges the capacitor 114 via resistor 108. This means that the resettable integrator 80 allows the transversal filter 10 to perform a normal equalizing operation during the time interval where the signal R assumes "1". On the contrary, when the signal R assumes "0", the gate 96 is closed and the gate 98 opens. As a result, the capacitor 114 discharges through a negative feedback loop including the gates 98, 100 and the resistor 108, and hence the output voltage $V_0$ is held at the threshold level of the input of the gate 98 whereby the output $V_1$ of the level shifter 104 is likewise held at a predetermined level. The output $V_1$ is normally so chosen that the tap weight at the main tap (wherein the controller 38 is provided) is "1" and that the tap weight at each of the other taps is "0". The level shifter 104 is provided for controlling the voltage difference $(V_0 - V_1)$ but can be omitted.

Once the clock and carrier synchronization is established in the demodulator 50, the signal AS continues to assume "1" by which the automatic adaptive equalizer restores its normal equalizing operation.

The advantage of this invention is clearly illustrated in FIG. 4, wherein (A) shows fading intensity as a function of time; (B) shows a signal AS produced without the provision of an equalizer; (C) shows a signal AS produced by a prior art equalizer (i.e. an equalizer which uses conventional resetting); and (D) shows the signal AS produced by the equalizer equipped with intermittent resetting according to the present invention. As will be appreciated (1) in the absence of an equalizer asynchronism is introduced at a lower fading level "x" (time point t1) and resynchronism is attained at the same fading level "x" (time point t4); (2) with the prior art synchronization the initialization of asynchronism is delayed to time point t2 due to the equalizing function but resynchronism is not improved; and (3) in the case of the present invention both the asynchronism and resynchronism are achieved at the higher fading intensity "y" thereby notably shortening a break or momentary cut-off of transmission.

FIG. 5 shows a second embodiment of this invention. In this arrangement the transversal filter 10 is arranged to receive a baseband signal from the coherent demodulator 50, which as shown, is located between the filter 10 and the input terminal 28. Other than this, the arrangement is essentially the same as disclosed in connection with the embodiment shown in FIG. 1. Accordingly detailed description of same is omitted for brevity.

The foregoing description shows only preferred embodiments of the present invention. Various modifications are apparent to those skilled in the art without departing from the scope of the present invention which is only limited by the appended claims. For example, the astable multivibrator 90 can be replaced by an other suitable repetitive signal oscillator such as a pseudorandom signal generator or a noise generator.

What is claimed is:

1. An automatic adaptive equalizer comprising:
   an equalizer for equalizing an incoming signal in response to a control signal;
   a demodulator;
   an asynchronism detector for detecting asynchronism in said demodulator;
   a control loop for producing said control signal according to the output of said equalizer, said control loop including a tap control signal generator and a plurality of resettable integrators;
   a reset control circuit provided between said asynchronism detector and said plurality of resettable integrators, and responsive to the output of said asynchronism detector for intermittently issuing a reset signal which is applied to said plurality of resettable integrators.

2. An automatic adaptive equalizer as claimed in claim 1, wherein said demodulator is coupled to the output of said equalizer.

3. An automatic adaptive equalizer as claimed in claim 1, wherein said demodulator precedes said equalizer.

4. An automatic adaptive equalizer as claimed in claim 1, wherein said reset control circuit includes a repetitive signal generator and a switching means, said switching means receiving the outputs of said repetitive signal generator and said asynchronism detector and producing said reset signal.

5. An automatic adaptive equalizer as claimed in claim 4, wherein said repetitive signal generator is an astable multivibrator.

6. An automatic adaptive equalizer as claimed in claim 4, wherein said repetitive signal generator is a pseudorandom signal generator.

7. An automatic adaptive equalizer as claimed in claim 4, wherein said repetitive signal generator is a noise generator.

8. An automatic adaptive equalizer as claimed in claim 1, wherein said control loop includes a tap control signal generator coupled to the input of said third means, and wherein said third means is a resettable integrator including an integrating means and a resetting circuit, said integrating means integrating the output of said tap control signal generator, and said resetting circuit responsive to said reset signal and intermittently resetting said integrating means.

* * * * *